(12) United States Patent
Lakshmanan et al.

(10) Patent No.: US 11,216,512 B2
(45) Date of Patent: Jan. 4, 2022

(54) ACCESSIBLE MACHINE LEARNING BACKENDS

(71) Applicant: FUJITSU LIMITED, Kawasaki (JP)

(72) Inventors: Vivek Lakshmanan, San Jose, CA (US); Jeffrey Fischer, Sunnyvale, CA (US); Suhas Chelian, San Jose, CA (US); Ajay Chander, San Francisco, CA (US)

(73) Assignee: FUJITSU LIMITED, Kawasaki (JP)

( * ) Notice: Subject to any disclaimer, the term of this patent is extended or adjusted under 35 U.S.C. 154(b) by 168 days.

(21) Appl. No.: 16/380,933

(22) Filed: Apr. 10, 2019

(65) Prior Publication Data
US 2020/0110774 A1    Apr. 9, 2020

Related U.S. Application Data

(60) Provisional application No. 62/742,836, filed on Oct. 8, 2018.

(51) Int. Cl.
*G06F 16/00* (2019.01)
*G06F 16/906* (2019.01)
(Continued)

(52) U.S. Cl.
CPC ........ *G06F 16/906* (2019.01); *G06F 16/9024* (2019.01); *G06N 20/00* (2019.01)

(58) Field of Classification Search
CPC ........ G06N 3/0454; G06N 3/08; G06N 5/022; G06N 20/00; G06F 16/9024; G06F 16/906
See application file for complete search history.

(56) References Cited

U.S. PATENT DOCUMENTS

| 8,719,197 B2* | 5/2014 | Schmidtler | G06Q 50/18 706/20 |
| 9,535,902 B1* | 1/2017 | Michalak | G06F 40/30 |

(Continued)

OTHER PUBLICATIONS

EP Office Action in Application No. 19199513.3 dated Feb. 25, 2020.
(Continued)

*Primary Examiner* — Shiow-Jy Fan
(74) *Attorney, Agent, or Firm* — Maschoff Brennan

(57) ABSTRACT

A method may include directing display of a dataset menu listing datasets representative of graphs. The method may include identifying features in the datasets as corresponding to nodes and edges. The method may include selecting local or global mapping to map categorical feature values to numeric values. Local mapping may be selected in response to a distribution of feature values not corresponding across different graphs. Global mapping may be selected in response to a distribution of the feature values corresponding across different graphs. The method may include directing display of configuration settings that indicate the selection between local and global mapping for training a classification model. The method may include obtaining selected configuration settings. The method may include providing the selected configuration settings and datasets to a machine learning backend, which may utilize the machine learning algorithm, datasets, and selected configuration settings to train the classification model.

20 Claims, 9 Drawing Sheets

(51) Int. Cl.
*G06F 16/901* (2019.01)
*G06N 20/00* (2019.01)

(56) References Cited

U.S. PATENT DOCUMENTS

| | | | |
|---|---|---|---|
| 2007/0150424 A1* | 6/2007 | Igelnik | G05B 17/02 |
| | | | 706/15 |
| 2011/0320387 A1* | 12/2011 | He | G06N 20/00 |
| | | | 706/12 |
| 2012/0005238 A1* | 1/2012 | Jebara | G06Q 30/02 |
| | | | 707/798 |
| 2017/0221240 A1 | 8/2017 | Stetson et al. | |
| 2018/0012231 A1 | 1/2018 | Sapoznik et al. | |
| 2018/0137155 A1* | 5/2018 | Majumdar | G06F 16/28 |
| 2018/0232443 A1* | 8/2018 | Delgo | G06F 16/35 |
| 2018/0336479 A1* | 11/2018 | Guttmann | G06T 7/97 |
| 2020/0019807 A1* | 1/2020 | Ma | G06K 9/6256 |

OTHER PUBLICATIONS

Fei et al., "Structure Feature Selection for Graph Classification", Proceedings of the 17th ACM conference on Information and knowledge management, Oct. 2008.
Maruhashi et al., "Learning Multi-Way Relations via Tensor Decomposition with Neural Networks", The Thirty-Second AAAI Conference on Artificial Intelligence (AAAI—Apr. 29, 2018).
Ribeiro, Marco Tulio, Sameer Singh, and Carlos Guestrin. "Model-agnostic interpretability of machine learning." arXiv preprint arXiv:1606.05386 (Jun. 16, 2016).
Perozzi, Bryan, Rami Al-Rfou, and Steven Skiena. "Deepwalk: Online learning of social representations." Proceedings of the 20th ACM SIGKDD international conference on Knowledge discovery and data mining. ACM, Mar. 26, 2014.
Duvenaud, David K., et al. "Convolutional networks on graphs for learning molecular fingerprints." Advances in neural information processing systems. Sep. 30, 2015.
EP Office Action in Application No. 19 199513.3 dated Jun. 8, 2021.

* cited by examiner

Dataset Filter For: darpa_30 ⎯ 300b

| Data | Features | Values | | |
|---|---|---|---|---|
| Use/Notuse | | Feature | | |
| ○— Use | | datetime [month/date/year-hour:min] | | |
| ○— Use | | Source IP Address | | |
| ○— Use | | Destination IP Address | | |
| ○— Use | | Source Port Number | | |
| —○ Use | | Destination Port Number | | |
| ○— Use | | Source IP Labels | | |
| ○— Use | | Value | | |
| —○ Use | | Comment | | |

336⎯

Dataset Filter For: darpa_30 ⎯ 300c

| Data | Features | Values |
|---|---|---|
| datetime [month/date/year-hour:min] | | datetime [month/date/year-hour:min] |
| Source IP Address | | ☐ 06/02/1998-01:2 |
| Destination IP Address | | ☐ 06/03/1998-11:5 |
| Source Port Number | | ☐ 06/03/1998-17:4 |
| Source IP Labels | | ☐ 06/04/1998-19:4 |
| Value | | ☐ 06/11/1998-22:3 |
| | | ☐ 06/11/1998-22:5 |
| | | ☐ 06/11/1998-23:2 |
| | | ☐ 06/12/1998-05:2 |
| | | ☐ 06/13/1998-03:3 |
| | | ▶ 06/16/1998-09:0 |
| | | ▶ 06/18/1998-04:0 |
| | | ▶ 06/18/1998-22:3 |
| | | ▶ 06/22/1998-16:0 |
| | | ▶ 06/22/1998-21:4 |
| | | ▶ 06/22/1998-23:5 |
| | | ▶ 06/23/1998-00:2 |
| | | ▶ 06/23/1998-09:1 |
| | | ▶ 06/23/1998-11:2 |
| | | ▶ 06/23/1998-12:1 |

Tensor Configuration Recommendation For: darpa_30

This page uses an algorithm to recommend a tensor configuration.
On the Define Tensor page, click on Apply Settings from Tensor Recommendation button to apply these recommendation settings.

[Recommend Tensor Configuration] ← 554

| Dimension | Field | Indexing (0, 1, 2) | Node Setting (A, B, C) | Maximum Count | Has Label | Label Field | Label Indexing (0, 1, 2) | Label Setting (A, B, C) | Label Maximum Count |
|---|---|---|---|---|---|---|---|---|---|
| 1 | Source IP Address | local (0) | - | - | No | - | - | - | - |
| 2 | Destination IP Address | local (0) | - | - | Yes | Source IP Labels | local (0) | - | - |
| 3 | Source Port Number | local (0) | - | - | No | - | - | - | - |
| 4 | Destination Port Number | local (0) | - | - | No | - | - | - | - |

Run Deep Tensor For: darpa_30

This page lets you run train, test or cross validation scripts. Scripts are started in docker instances, which you can connect to.

- Train config file used is $HOME/fla_deeptensor/deeptensor_results_UI/<your_dataset_directory>/config_<your_dataset_directory>.cfg.
- Test config file used is $HOME/fla_deeptensor/deeptensor_results_UI/<your_dataset_directory>/config_<your_dataset_directory>_test.cfg.
- Cross validation config file used is $HOME/fla_deeptensor/deeptensor_results_UI/<your_dataset_directory>/config_<your_dataset_directory>_test.cfg.

- Logs are streamed to the files $HOME/fla_deeptensor/deeptensor_results_UI/<your_dataset_directory>*.log.
- Run "docker exec -it <container_id> bash" to go inside container.

| Run Train | Run Test | Run Cross Validation |
|---|---|---|
| Visualize Train Output | Visualize Test Output | Visualize CV Output |

Tain Results With Confusion Matrix

| Actual Class (Rows) | Predicated Class (Columns) | |
|---|---|---|
| | Class 0 | Class 1 |
| Class 0 | True Negative: 21 | False Positive: 2 |
| Class 1 | True Negative: 2 | True Positive: 21 |
| Accuracy | 91.30 | |
| Precision | 91.30 | |
| Recall | 91.30 | |

FIG. 6

ACCESSIBLE MACHINE LEARNING BACKENDS

CROSS-REFERENCE TO RELATED APPLICATION

This patent application claims the benefit of and priority to U.S. Provisional App. No. 62/742,836 filed Oct. 8, 2018 titled "ACCESSIBLE MACHINE LEARNING BACKENDS," which is incorporated in the present disclosure by reference in its entirety.

FIELD

The embodiments discussed in the present disclosure are related to accessible machine learning backends.

BACKGROUND

Machine learning systems may utilize multiple different text files, formats, or configuration scripts to configure a machine learning backend. However, the different text files, formats and configuration scripts may include language and information that are displayed in a manner that is not readily understood by a user of the machine learning system. For example, the user may be a domain expert rather than an expert in a particular machine learning backend. As such, the user of the machine learning system may not be familiar with terminology and file formats used by the machine learning backend.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method. The method may include directing display, on a display screen, of a dataset menu listing one or more datasets. Each dataset may be representative of one or more graphs. Additionally, each dataset may include one or more features that include corresponding feature values. Responsive to a user selection of one or more datasets, the method may also include identifying features in the datasets as corresponding to nodes and edges in the representative graphs. Additionally, the method may include selecting a local mapping scheme or a global mapping scheme to map categorical values of the feature values of the nodes and the edges to numeric target values for use by a machine learning algorithm. The local mapping scheme may utilize unique values across different graphs. The local mapping scheme may be selected for nodes and edges in response to a distribution of feature values of the nodes and the edges not corresponding across different graphs. The global mapping scheme may utilize the same values across different graphs. The global mapping scheme may be selected for nodes and edges in response to a distribution of the feature values of the nodes and the edges corresponding across different graphs. Furthermore, the method may include directing display, on the display screen, of one or more configuration settings for training a graph classification model to classify graphs based on the graphs represented by the datasets. The configuration settings may indicate the selection between the local mapping scheme and the global mapping scheme for each of the categorical values of the feature values of the nodes and the edges. Responsive to directing display of one or more configuration settings, the method may include obtaining selected configuration settings from the user. Responsive to obtaining the selected configuration settings, the method may also include providing the selected configuration settings and the datasets to a machine learning backend. The machine learning backend may utilize the machine learning algorithm, the datasets, and the selected configuration settings to train the graph classification model.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which:

FIGS. 3A and 3B illustrate screen shots of a graphical user interface (GUI) displaying selection fields related to dataset import and filtering for accessible ML that may be implemented in the computing device of FIG. 1;

FIG. 5 illustrates a screen shot of the GUI displaying a recommendation for configuration settings and a selection field related to ML that may be implemented in the computing device of FIG. 1;

FIG. 6 illustrates a screen shot of the GUI displaying a confusion matrix and selection fields related to ML that may be implemented in the computing device of FIG. 1;

DESCRIPTION OF EMBODIMENTS

Figure 1:
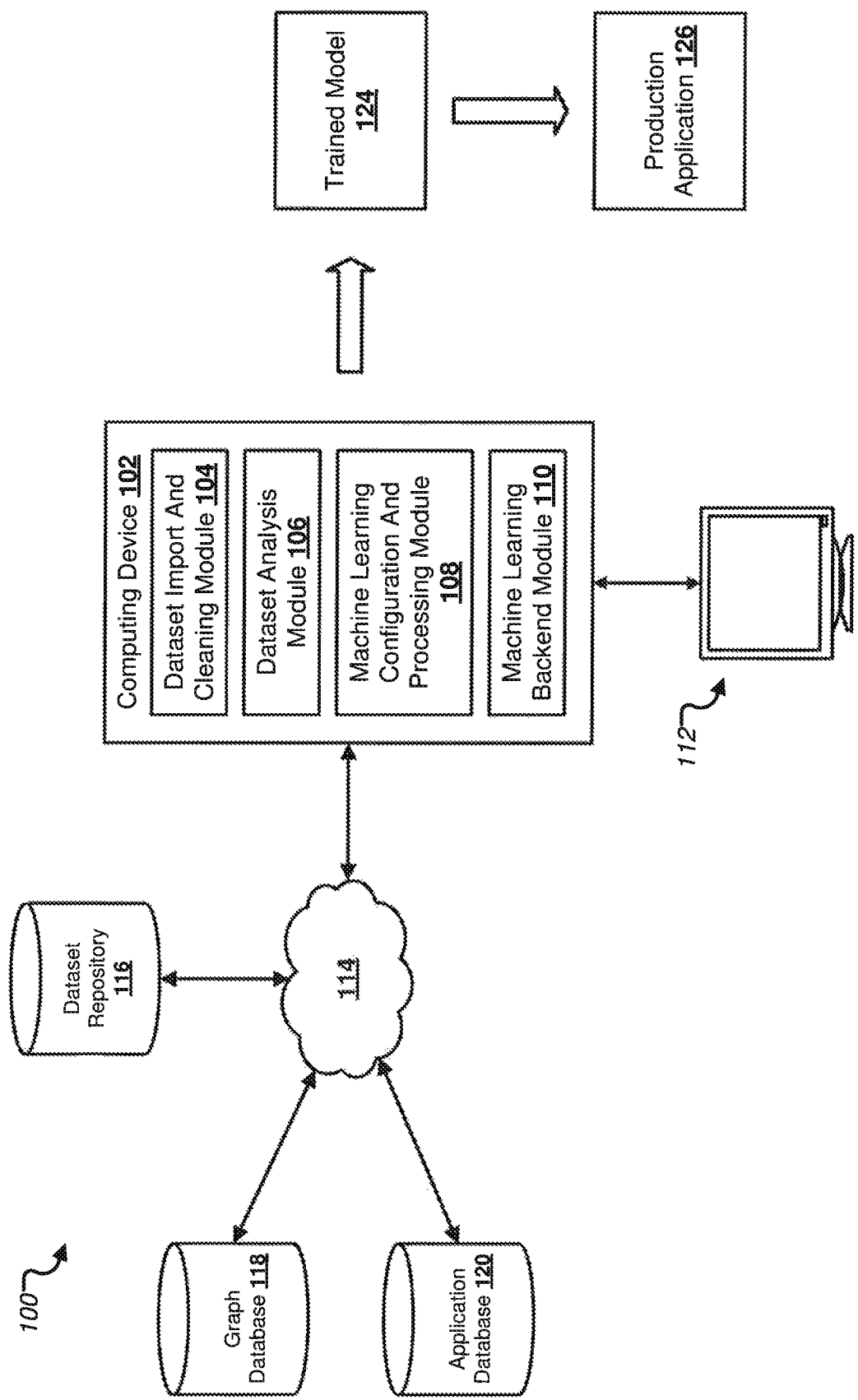
FIG. 1 illustrates an example environment related to accessible machine learning (ML) backends.

Datasets may describe aspects of different domains along with components and items included in those domains. The datasets may include information representative of nodes and edges corresponding to graphs describing the domains. The nodes, the edges, and the graphs may describe the domains according to a graphical format. In some embodiments, the nodes may represent different components and/or items in the domains. Additionally, in some embodiments, the edges may represent relationships between the nodes in the domains (e.g., relationships between the different components and/or items in the domains). Likewise, in some embodiments, the graphs may be a representation of a multiple components (e.g., the nodes) and directed and/or undirected edges representing connections between the components. The datasets may include features that correspond to the edges and the nodes. The datasets may also include features that correspond to labels of the edges and the nodes. In addition, the features may include feature values that describe aspects of the edges and the nodes.

The datasets may also include information representative of classifications of the graphs. For example, the information representative of the classifications of the graphs may indicate an associated category of each of the graphs. At least a portion of the features, the feature values, and the information representative of the classifications of the graphs may be provided to a machine learning (ML) backend. The features, the feature values, and the information representative of the classifications of the graphs may be used by the ML backend to generate or train a graph classification model that may be configured to classify unknown graphs into categories for which the graph classification model is trained.

In some graph classification technologies, displaying the datasets may be performed by a user writing code. In addition, querying the datasets either via the display or other methods may not be possible for some graph classification technologies. The lack of options to query the datasets prior to being provided to the ML backend, may greatly reduce the ability of the user to explore the datasets and make decisions regarding what portions of the datasets to provide to the ML backend.

In some graph classification technologies, the format in which the datasets are displayed may not be easily understood by the user. For example, the datasets may be displayed in a tabular format (e.g., include tabular data) without labels or other identifying information. Manual analysis of the datasets in the tabular format may be difficult for the user to decipher and/or determine which characters and values in the display correspond to which datasets, features, feature values, and/or classifications of the graphs.

Additionally, in some graph classification technologies, the datasets may not be easily displayed in two dimensions since the datasets may be stored in a format that is designed to be displayed in three or more dimensions (e.g., the datasets may be stored as tensors). In these and other graph classification technologies, displaying the datasets in three or more dimensions may increase the difficulty for the user to understand the datasets. Furthermore, in some graph classification technologies, the user may not be provided recommendations on what portions of the datasets or other configuration settings to provide to the ML backend.

In some graph classification technologies, preparing the datasets for use by the ML backend for training the graph classification model may also be performed by writing code to handle specific datasets and/or tabular formats of the datasets. Manually writing the code for preparing the datasets may be slow and error prone. Additionally, manually writing the code for preparing the datasets may increase development time and costs associated with training and testing the graph classification model.

In some graph classification technologies, preparing the datasets for use by the ML backend for training the graph classification model may be implemented by textual files in configuration formats. These textual files may not be easily read and/or understood by the user. For example, the textual files may cause the user to refer to a manual to determine which fields to select and/or populate for different situations (e.g., which features and feature values to select and/or populate for different situations). Additionally, the text of the textual files may be difficult for the user to decipher and determine which characters correspond to which datasets, features, feature values, and/or classifications of the graphs. The process of referring to the manual, manually selecting and populating the different fields, and manually verifying the fields within the textual files may be slow and error prone, which may also increase the development time and the costs associated with training and testing the graph classification model.

In some graph classification technologies, preparing the datasets to be used by the ML backend for training the graph classification model may involve editing complex and interconnected configuration scripts. Additionally, the interconnectivity of the configuration scripts may not be clearly indicated within the configuration scripts.

In some graph classification technologies, results of the ML backend training the graph classification model (e.g., ML data) may be output as a text file including only numeric data (e.g., numerical characters). The inclusion of only numerical characters in the ML data may occur due to the ML backend being capable of reading and operating using numerical characters and not alphabetic characters (e.g., alpha characters). The numerical data may be difficult for the user to decipher and determine which characters correspond to which datasets, features, feature values, and/or classifications of the graphs. The user may not be able to easily read and understand the numerical characters of the text files, which may increase the number of errors in verification of the training of the graph classification model.

Additionally, in some graph classification technologies, the ML data may include a ML backend specific representation. For example, the ML data may include a tensor representation (e.g., a multidimensional matrix representation). Furthermore, the ML data may include mathematical specific terminology that is not commonly familiar to many users. Additionally, some graph classification technologies, may output the ML data as configuration scripts. The user reviewing and editing the ML data as the configurations scripts may also increase time and costs associated with training and testing the graph classification model.

Some graph classification technologies may limit the use of the ML backend to users that are familiar with the ML backend. For example, users editing and reviewing the configuration scripts may limit the use of the ML backend to users that are familiar with specific configuration settings of the ML backend. As another example, the user editing and reviewing the ML data in the ML backend specific representation or in the configuration scripts may limit the use of the ML backend to users that are familiar with the numerical output of the ML backend.

Therefore, a need exists for an accessible ML backend that does not limit its use to users that are familiar with the ML backend. According to various embodiments described in this disclosure, a graphical user interface (GUI) displayed on a display screen may guide the user through the steps of selecting and importing datasets, analyzing the datasets for recommended configuration settings, selecting configuration settings, and providing the datasets to the ML backend to train the graph classification model.

In some embodiments, a dataset menu listing datasets to select may be displayed on the display screen. Additionally, in these and other embodiments, the dataset menu may list an option to import one or more new datasets. The user may select one or more of the datasets to use for training the graph classification model. The features in the datasets may be identified as corresponding to edges or nodes in the graphs. Additionally, for each of the features identified as edges and nodes, the datasets may be analyzed to determine whether global mapping or local mapping should be used to map the corresponding edges or the corresponding nodes by a ML algorithm during training of the graph classification model. In some embodiments, local mapping may utilize unique values for mapping the edges and the nodes to the graphs by the ML algorithm. For example, a first feature may be mapped to a node labelled as "one" in a first graph and a node labelled as "two" in a second graph by the ML algorithm. Likewise, in some embodiments, global mapping may utilize a same value for mapping the edges and the nodes to the graphs by the ML algorithm. For example, the first feature identified as a node may be mapped to the node labelled as "one" in each of the graphs by the ML algorithm.

In some embodiments, configuration settings for the ML algorithm may be displayed on the display screen. The configuration settings may indicate the selection of local mapping or global mapping for each of the edges and the nodes represented in the datasets. User input may be received, via the GUI displayed on the display screen, selecting the configuration settings (e.g., providing selected configuration settings). For example, the selected configuration settings may include the configuration settings indicating the selection of local mapping and global mapping for each of the nodes and the edges represented in the datasets. As another example, the selected configuration settings may include configuration settings manually selected by the user. The selected configuration settings and the datasets may be sent to the ML backend. The ML backend may utilize the ML algorithm, the datasets, and the selected configuration settings to train the graph classification model.

A benefit of the embodiments described in the present disclosure may include reduced development time and costs for a user with respect to training and testing the graph classification model. For example, the user may not edit configuration scripts for selecting the datasets, preparing the datasets to be provided to the ML backend, or selecting the configuration settings of the ML algorithm. The lack of use of configuration scripts may permit users that are not familiar with the ML backend to train and test the graph classification model.

Additionally, a benefit of the embodiments described in the present disclosure may include quicker access to data stored in an electronic device. For example, embodiments described in the present disclosure may permit the user to train and test the graph classification model without referring to a manual or deciphering large blocks of tabular data, which may allow the user to access the ML backend and properly train and test the graph classification model more quickly than using textual files and/or configuration scripts.

Likewise, embodiments described in the present disclosure may convert and display the datasets and the ML data as graphical representations, which may speed up the process for the user to understand the datasets and/or the ML data. For example, the ML data may be converted to ML results that are human readable. Likewise, embodiments described in the present disclosure may increase a speed in which navigation of the training and testing of the graph classification model occurs. For example, embodiments disclosed in the present disclosure may display the datasets as a graphical representation that can be navigated and explored more quickly than configuration scripts and tabular data. The graphical representation may permit the user to more quickly navigate the process to train and test the graph classification model.

Furthermore, embodiments disclosed in the present disclosure may provide selection fields for the user to input data and make clear which values to select and what are valid value ranges for training and testing the graph classification model. Likewise, embodiments disclosed in the present disclosure may determine configuration recommendations, which may reduce an amount of time to train and test the graph classification model since the user may not have to guess what configuration settings to use. Furthermore, embodiments disclosed in the present disclosure may improve an experience of the user by converting the numerical data included in the ML data to a graphical representation in the ML results. The user may be able to make decisions about subsequent actions based on the graphical representation included in the ML results.

Embodiments disclosed in the present disclosure may provide samples of the datasets and the ML data without overwhelming the user by including each row and/or column of the tabular data or each numerical character of the datasets or the ML data. Additionally, displaying the samples of the datasets and the ML data within the GUI may eliminate the opening of a separate application to view the datasets and the ML data. Furthermore, embodiments discussed in the present disclosure may reduce the amount of time used to perform parameter sweeps to generate corresponding files.

Embodiments of the present disclosure are explained with reference to the accompanying drawings.

FIG. 1 illustrates an example environment related to accessible ML backends. The operating environment 100 may include a computing device 102, which may be configured for accessible ML backend processes. The operating environment 100 may also include a display screen 112, a network 114, a dataset repository 116, a graph database 118, and an application database 120.

The computing device 102 may include a dataset import and cleaning module 104, a dataset analysis module 106, a ML configuration and processing module 108, and a ML backend module 110. The computing device 102, the dataset repository 116, the graph database 118, the application database 120, or some combination thereof may communicate information and data via the network 114. Each of the computing device 102, the dataset repository 116, the graph database 118, and the application database 120 are briefly described below.

The network 114 may include any communication network configured for communication of signals between any of the components (e.g., 102, 116, 118, and 120) of the operating environment 100. The network 114 may be wired or wireless. The network 114 may have numerous configurations including a star configuration, a token ring configuration, or another suitable configuration. Furthermore, the network 114 may include a local area network (LAN), a wide area network (WAN) (e.g., the Internet), and/or other interconnected data paths across which multiple devices may communicate. In some embodiments, the network 114 may include a peer-to-peer network. The network 114 may also be coupled to or include portions of a telecommunications network that may enable communication of data in a variety of different communication protocols.

In some embodiments, the network 114 includes or is configured to include a BLUETOOTH® communication network, a Z-Wave® communication network, an Insteon® communication network, an EnOcean® communication network, a Wi-Fi communication network, a ZigBee communication network, a HomePlug communication network, a Power-line Communication (PLC) communication network, a message queue telemetry transport (MQTT) communication network, a MQTT-sensor (MQTT-S) communication network, a constrained application protocol (CoAP) communication network, a representative state transfer application protocol interface (REST API) communication network, an extensible messaging and presence protocol (XMPP)

communication network, a cellular communication network, any similar communication networks, or any combination thereof for sending and receiving data. The data communicated in the network 114 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with the computing device 102, the dataset repository 116, the graph database 118, and the application database 120.

The dataset repository 116, the graph database 118, and the application database 120 may include any memory or data storage, which may be similar to a memory 782 discussed below in relation to FIG. 7. The dataset repository 116, the graph database 118, and the application database 120 may include network communication capabilities such that other components in the operating environment 100 may communicate with the dataset repository 116, the graph database 118, and the application database 120.

The dataset repository 116 may include any computer-based or hardware-based computing system. The dataset repository 116 may include a system or device with which datasets are configured to be stored. The dataset repository 116 may include datasets that include information that is representative of nodes and edges corresponding to graphs describing domains.

The graph database 118 may include any computer-based or hardware-based computing system. The graph database 118 may include a system or device with which graph formats are configured to be stored. The graph database 118 may include example graphs, graph format files, or datasets and graphical representations as discussed in the present disclosure.

The application database 120 may include any computer-based or hardware-based computing system. The application database 120 may include a system or device with which the datasets and the graphical representations are configured to be stored. The application database 120 may include the datasets and the graphical representations as discussed in the present disclosure.

The computing device 102 may include a computer-based hardware device that includes a processor, memory, and communication capabilities. The computing device 102 may be coupled to the network 114 to communicate data with one or more of the other components of the operating environment 100 (e.g., 116, 118, and 120). Some examples of the computing device 102 may include a smartphone, a tablet computer, a laptop computer, or a desktop computer, etc. The computing device 102 may include a processor-based computing device. For example, the computing device 102 may include a hardware server or another processor-based computing device configured to function as a server.

The display screen 112 may display a GUI to the user to guide the user through the process to train and test a trained model 124 (e.g., a graph classification model). The GUI displayed on the display screen 112 may permit the user to load, filter, display, and perform training and testing of the trained model 124 using the datasets, configurations settings, and an ML algorithm. The GUI may be displayed on the display screen 112 through a web browser or an application that is native to the computing device 102.

The dataset import and cleaning module 104 may direct display, on the display screen 112, of a dataset menu via the GUI. The dataset menu may list the datasets included in the dataset repository 116. The datasets may include features and corresponding features values. A portion of the features may correspond to edges or nodes of the graphs represented in the datasets. Additionally, a portion of the features may correspond to labels of the edges and the nodes. Likewise, the feature values may describe aspects of the edges and the nodes. Furthermore, the dataset menu may list selectable fields corresponding to the datasets. The user may select datasets to import from the dataset repository 116 by selecting one or more corresponding selectable fields in the dataset menu.

The dataset import and cleaning module 104 may receive the datasets from the dataset repository 116. In some embodiments, the dataset import and cleaning module 104 may convert the datasets received from the dataset repository into format compatible with the GUI. In these and other embodiments, the datasets may be received in or converted into a spreadsheet format, a comma-separated value (CSV) format, a text format, a relational database format, or any other appropriate tabular file format.

The dataset import and cleaning module 104 may import and read the datasets received from the dataset repository 116. In some embodiments, the datasets may include historical data representative of the graphs that were previously classified and labelled (e.g., classifications of the graphs). The dataset import and cleaning module 104 may identify the features in the dataset that correspond to nodes and edges in the graphs. In some embodiments, the datasets may include historical data representative of the features that were previously identified as nodes and edges. In other embodiments, the dataset import and cleaning module 104 may receive user input via the GUI displayed on the display screen 112 indicating which features correspond to edges and which features correspond to nodes. Additionally or alternatively, the dataset import and cleaning module 104 may receive user input via the GUI displayed on the display screen 112 indicating which features correspond to labels of the edges and nodes. Likewise, in some embodiments, the dataset import and cleaning module 104 may identify the features in the dataset that correspond to nodes and edges in the graphs based on a combination of the historical data included in the datasets and user input received via the GUI displayed on the display screen 112.

In some embodiments, the dataset import and cleaning module 104 may direct display of a portion of the datasets via the GUI on the display screen 112. For example, if the datasets are stored in a spreadsheet format, a sample of the spreadsheet may be displayed. In these and other embodiments, ranges for the feature values may also be displayed on the display screen 112. The portion of the datasets may be displayed to show the user a current state of the datasets. Additionally, the portion of the datasets may be displayed to show the use what type of features and feature values are included in the datasets.

The dataset import and cleaning module 104 may direct display of one or more filter fields via the GUI on the display screen 112 to filter the features and the feature values included in the datasets. For example, the dataset import and cleaning module 104 may direct display of one or more columns and/or rows of the datasets to delete and/or edit. Additionally or alternatively, the dataset import and cleaning module 104 may direct display of the filter fields configured to arrange columns in ascending order. In some embodiments, the dataset import and cleaning module 104 may direct display of the filter fields configured to delete portions of the datasets that are below or above a dataset threshold value. Filtering the features and the features values may prevent the filtered features and the filtered feature values from being provided to the ML backend module 110 to train the trained model 124.

In some embodiments, the dataset import and cleaning module 104 may direct display of selectable fields via the GUI on the display screen 112 for the user to label different features, identify features as nodes; edges; or labels, or classify the graphs in the datasets. In these and other embodiments, responsive to receiving user input indicating the labels of different features, the identities of the features, and the classification of the graphs, the dataset import and cleaning module 104 may use example graphs stored in the graph database 118 to map the datasets to one or more graphical representations. The dataset import and cleaning module 104 may direct display of the datasets as the graphical representations via the GUI on the display screen 112. The graph database 118 may include a Neo4j® database or any other appropriate graph database.

In some embodiments, the user may query the graphical representation of the datasets and change the way the graphical representation of the datasets is displayed. For example, the user may query specifics regarding portions of the graphical representation of the datasets using query language entered via the GUI (e.g., using Cypher®). As another example, the user may query specifics regarding portions of the graphical representation of the datasets through pre-defined queries that are displayed to the user via the GUI. Additionally, querying the graphical representation of the datasets, via the GUI, may permit filtering of the nodes and/or edges. For example, querying the graphical representation of the datasets may permit filtering a first N1 nodes and edges of a first category of the graphs and a first N2 nodes of a second category of the graphs.

In some embodiments, the datasets and the labelling of the features, identification of the features, and classification of the graphs may be provided to and stored by the application database 120. Additionally or alternatively, the datasets and the labelling of the features, identification of the features, and classification of the graphs may be provided to and stored by the graph database 118. The datasets may be stored using a database format, a flat file format, or any other appropriate format.

The dataset analysis module 106 may select one or more configuration settings to recommend to the user. The configuration settings recommended to the user may indicate what type of mapping (e.g., local mapping or global mapping) of each of the nodes the ML algorithm should perform in different graphs to provide better training and testing of the trained model 124. Additionally, in some embodiments the configuration settings selected by the dataset analysis module 106 may indicate whether decomposition of the features may improve the results of the training and testing of the trained model 124. Alternatively or additionally, the configuration settings selected by the dataset analysis module 106 may include percentages of the datasets to separate as a train portion and a test portion, as discussed in more detail below. In some embodiments, the train portion may include between seventy and ninety percent of the datasets and the test portion may include between ten and thirty percent of the datasets.

Additionally, the dataset analysis module 106 may select configuration settings that indicate whether to classify each feature as a possible dimension, a sure dimension (e.g., classify as a possible edge or node or a sure edge or node), or a non-portion of the datasets (e.g., a non-node, a non-edge, or a non-label value). Likewise, the configuration settings selected by the dataset analysis module 106 may indicate whether each possible dimension may be re-classified as sure dimensions or classified as labels of sure dimensions. Likewise, the dataset analysis module 106 may select configuration settings that indicate whether each type of graph in the dataset should be sampled in equal numbers or not (e.g., whether each category of graph is to be sampled in equal numbers.) The dataset analysis module 106 may direct display of the configuration settings selected by the dataset analysis module 106 via the GUI on the display screen 112.

In some embodiments, the configuration settings selected by the dataset analysis module 106 may be determined using statistical analysis of the datasets. In some embodiments, the statistical analysis may include any correlations between the nodes and the edges and similarity of feature value distribution of the nodes and the edges.

In some embodiments, the ML backend module 110 may be capable of processing categorical data representing discrete entities rather than quantities. This categorical data may be in the form of integer values or alphabetic character values. In these and other embodiments, the dataset analysis module 106 may select global mapping or local mapping for a particular edge or node to indicate how the categorical values associated with the particular edge or node (e.g., alphabetic characters associated with the particular edge or node) are to be mapped to numeric target values that are compatible with the ML backend module 110.

In some embodiments, the dataset analysis module 106 may select global mapping for a particular node or edge if an identity of the particular node or edge is more important than a topology of the corresponding graphs. For example, the dataset analysis module 106 may select global mapping for the particular edge or node if a distribution of the corresponding feature value corresponds across different graphs in the datasets. In these and other embodiments, the dataset analysis module 106 may select local mapping for the particular node or edge if the identity of the particular node or edge is not as important as the topology of the corresponding graphs. For example, the dataset analysis module 106 may select local mapping for the particular edge or node if the distribution of the feature values does not correspond across different graphs in the datasets.

In some embodiments, the dataset analysis module 106 may classify each feature in the datasets as a sure dimension (e.g., a sure edge or a sure node), a possible dimension (e.g., a possible edge or a possible node), or a non-portion of the datasets (e.g., a non-node, a non-edge, or a non-label value). In some embodiments, the dataset analysis module 106 may classify each feature in the datasets based on information included in the datasets. In other embodiments, the dataset analysis module 106 may classify each feature in the datasets based on user input received via the GUI displayed on the display screen 112. Likewise, in some embodiments, the dataset analysis module 106 may classify each feature in the datasets based on a combination of the information included in the datasets and user input received via the GUI displayed on the display screen 112.

Additionally, in some embodiments, the dataset analysis module 106 may generate a histogram for each graph in the datasets. In these and other embodiments, the histograms may include each feature value corresponding to sure dimensions in the corresponding graphs.

In some embodiments, the dataset analysis module 106 may determine whether distributions of the sure dimensions are similar across different graphs. For example, the dataset analysis module 106 may determine whether the feature values occur across the graphs. In these and other embodiments, if a feature value occurs across the graphs, the corresponding sure dimension may be stable and may be assigned global mapping. Alternatively, if the feature value does not occur across the graphs, the corresponding sure dimension may not be stable and may be assigned local mapping. In some embodiments, a histogram of the feature values for each graph may be generated. In these and other embodiments, for each combination of histograms, a distance between feature values included in a set of combined histograms may be determined. Additionally, in some embodiments, the distance between the feature values included in the set of combined histograms may be determined according to Equation 1.

$$1-(\text{cosine distance corresponding to the feature occurrence in each graph}) \quad \text{Equation 1}$$

The distance between the histograms corresponding to the set of graphs may be equal to the distance between the corresponding feature values in the set of graphs. In other embodiments, the distance between the feature values may be determined according to Lp norm method, a Kullback-Leibler (KL) divergence method, or any other appropriate method. In these and other embodiments, the distance between each feature value in the histograms may be added to a corresponding total similarity value. For example, the distance between a first feature value in each combination of histograms that includes the first feature value may be added to a first total similarity value.

In some embodiments, the dataset analysis module 106 may determine an average similarity value for each of the features values across the histograms (e.g., an average distance between the features values in the histograms). In these and other embodiments, the dataset analysis module 106 may determine the average similarity value by dividing the total similarity value by a number of graphs that include the corresponding feature value. Alternatively or additionally, the dataset analysis module 106 may compare the average similarity value of a particular sure dimension to a similarity threshold value. In some embodiments, if the average similarity value of the particular sure dimension is greater than the similarity threshold value, the dataset analysis module 106 may select global mapping for the particular sure dimension. In these and other embodiments, if the average similarity value is equal to or less than the similarity threshold value, the dataset analysis module 106 may select local mapping for the particular sure dimension.

In some embodiments, the similarity threshold value may be based on user input received via the GUI displayed on the display screen 112. In other embodiments, the similarity threshold value may be based on an amount of data included in the datasets. For example, a number of features or feature values in the datasets or an amount of memory space used to store the datasets. Additionally or alternatively, the similarity threshold value may be based on testing and simulation performed by the user via the GUI displayed on the display screen 112 using representative datasets. For example, the user may operate the ML backend module 110 using a collection of representative datasets and multiple values for the similarity threshold value (e.g., three to five different values). The value that yields the best results for the representative datasets may be selected as the similarity threshold value. In these and other embodiments, the similarity threshold value may be a value between 0.1 and one. For example, the similarity threshold value may be a value of 0.4, 0.5, 0.553, 0.63, 0.682, 0.721, 0.819, 0.92, among others.

In some embodiments, the dataset analysis module 106 may determine whether to perform data decomposition for each sure dimension for which global mapping is selected (e.g., the dataset analysis module 106 may select a data reduction scheme or a non-data reduction scheme for each sure dimension for which global mapping is being utilized). In these and other embodiments, data decomposition may reduce a number of feature values corresponding to each sure dimension for which global mapping is selected. The dataset analysis module 106 may determine whether to perform data decomposition based on whether a number of unique feature values exceed a unique value threshold value.

The dataset analysis module 106 may determine the number of unique feature values across the histograms. The number of unique feature values may include the number of different feature values across the histograms. For example, if a first histogram includes the feature values 1, 3, 6, and 10 and a second histogram includes the feature values 1, 6, 9, and 10, the number of unique feature values may be five. The dataset analysis module 106 may compare the number of unique feature values to the unique value threshold value. In some embodiments, if the number of unique feature values exceeds the unique value threshold value, the dataset analysis module 106 may select data decomposition to be performed for each sure dimension in the datasets. In these and other embodiments, if the number of unique feature values is equal to or less than the unique value threshold value, the dataset analysis module 106 may select data decomposition to not be performed for the sure dimensions in the datasets.

In some embodiments, the dataset analysis module 106 may determine the number of unique values only across histograms that include a particular sure dimension. The dataset analysis module 106 may compare the number of unique values across only the histograms that include the particular sure dimension to the unique value threshold value. In some embodiments, if the number of unique values across only the histograms that include the particular sure dimension exceeds the unique value threshold value, the dataset analysis module 106 may select data decomposition to be performed for the corresponding sure dimension. In these and other embodiments, if the number of unique values across only the histograms that include the particular sure dimension is equal to or less than the unique value threshold value, the dataset analysis module 106 may select data decomposition to not be performed for the corresponding sure dimension.

In some embodiments, the unique value threshold value may be based on user input received via the GUI displayed on the display screen 112. In other embodiments, the unique value threshold value may be based on the amount of data included in the datasets. For example, the number of features or feature values in the datasets or the amount of memory space used to store the datasets. Additionally or alternatively, the unique value threshold value may be based on testing and simulation performed by the user via the GUI displayed on the display screen 112 using representative datasets. For example, the user may operate the ML backend module 110 using the collection of representative datasets and multiple values for the unique value threshold value (e.g. three to five different values). The value that yields the best results for the representative datasets may be selected as the unique value threshold value. In some embodiments, the unique value threshold value may be between twenty and five thousand. For example, the unique value threshold value may be 100, 200, 400, 600, 700, 1500, 2200, 3000, 3700, 4300, among others.

Additionally, in some embodiments, the dataset analysis module 106 may determine a correlation between feature values of each possible dimension in each graph (e.g., a correlation value). The dataset analysis module 106 may determine whether each possible dimension is independent. In some embodiments, the dataset analysis module 106 may determine whether each possible dimension is independent based on a correlation between each possible dimension and each sure dimension. In some embodiments, if the dataset analysis module 106 determines a particular possible dimension is not independent, the particular possible dimension may be a label of a sure dimension (e.g., the label may be subordinate to the corresponding sure dimension). In these and other embodiments, if the dataset analysis module 106 determines a particular possible dimension is independent, the particular possible dimension may be re-classified as a sure dimension In some embodiments, the dataset analysis module 106 may determine a p value for the correlation value (e.g., the statistical significance of the correlation) of each possible dimension and each sure dimension according to a corresponding p value and statistical techniques (e.g., include if p<0.05). In some embodiments, if the correlation between the particular possible dimension and one or more sure dimensions is statistically significant (e.g., the corresponding p value is equal to or less than a statistical significance threshold value), the particular possible dimension may be labelled as a label of the one or more sure dimensions. In these and other embodiments, if the correlation between the particular possible dimension and one or more sure dimensions is not statistically significant (e.g., the corresponding p value is greater than the statistical significance threshold value), the particular possible dimension may be re-classified as a sure dimension.

In some embodiments, the steps described for selecting global mapping or local mapping of the sure dimensions may also be performed using the possible dimensions re-classified as sure dimensions.

In some embodiments, the statistical significance threshold value may be based on user input received via the GUI displayed on the display screen 112. In other embodiments, the statistical significance threshold value may be based on the amount of data included in the datasets. For example, the number of features or feature values in the datasets or the amount of memory space used to store the datasets. Additionally or alternatively, the statistical significance threshold value may be based on testing and simulation performed by the user via the GUI displayed on the display screen 112 using representative datasets. For example, the user may operate the ML backend module 110 using the collection of representative datasets and multiple values for the statistical significance threshold value (e.g., three to five different values). The value that yields the best results for the representative datasets may be selected as the statistical significance threshold value. In some embodiments, the statistical significance threshold value may be between 0.001 and one. For example, the statistical significance threshold value may be one of 0.05, 0.015, and 0.027 among others.

The ML configuration and processing module 108 may direct display of the configuration settings selected by the ML configuration and processing module 108 via the GUI on the display screen 112. Additionally, responsive to the configuration settings selected by the ML configuration and processing module 108 being displayed via the GUI on the display screen 112, the ML configuration and processing module 108 may obtain selected configuration settings. In some embodiments, the selected configuration settings may include the configuration settings selected by the dataset analysis module 106. In other embodiments, the selected configuration settings may include configuration settings manually selected by the user via the GUI displayed on the display screen 112.

The ML configuration and processing module 108 may convert the configuration settings to a format that is compatible with the ML backend module 110. For example, in some embodiments, the ML configuration and processing module 108 may convert alpha values in the datasets to numeric values. The ML configuration and processing module 108 may convert the datasets to a flat file format, a relational database format, or any other appropriate format. In some embodiments, the ML configuration and processing module 108 may perform the mapping of the sure dimensions. The ML configuration and processing module 108 may map the sure dimensions according to the selected configuration settings.

In some embodiments, the ML configuration and processing module 108 may separate the datasets into the train portion and the test portion. In these and other embodiments, the datasets may be separated into the train portion and the test portion based on the selected configuration settings. For example, the selected configuration settings may indicate that eighty percent of the datasets is to be included in the train portion and twenty percent of the datasets is to be included in the test portion. The ML configuration and processing module 108 may provide the selected configuration settings and the datasets to the ML backend module 110.

The ML backend module 110 may utilize one or more ML algorithms (e.g., ML backends) to train and test the trained model 124. Examples of the ML algorithms may include a DeepTensor algorithm, a DeepWalk algorithm, and a Graph Convolutional Networks algorithm. Additionally, the ML backend module 110 may utilize the selected configuration settings and the train portion of the datasets to train the trained model 124. In some embodiments, the ML backend module 110 may classify the graphs included in the train portion of the datasets. In these and other embodiments, the ML backend module 110 may be trained on how to classify graphs of the same or similar domain of the graphs in the datasets based on the train portion. Additionally, the ML backend module 110 may generate the trained model 124 for classifying graphs received in the future.

The ML backend module 110 may utilize the selected configuration settings and the test portion to test the trained model 124. In some embodiments, the ML backend module 110 may classify graphs in the test portion. Additionally, the graphs may include historical data indicating a classification of the graphs previously performed. The classification performed by the ML backend module 110 may be compared to the historical data indicating the classification of the graphs previously performed to determine whether the trained model 124 is correctly trained.

Additionally, the ML backend module 110 may utilize the train portion and the test portion to cross-validate the trained model 124. In some embodiments, the ML backend module 110 may perform cross validation of the trained model 124 according to four fold division, five fold division, or any other appropriate method. Additionally, in some embodiments, the ML backend module 110 may perform cross validation of the trained model 124 according to exhaustive, leave p-out, leave one out, non-exhaustive, k-fold, holdout, repeated random sub-sampling, or any other appropriate method or algorithm.

The ML backend module 110 may also determine one or more statistics regarding the training, testing, or cross-validation process of the trained model 124. Additionally, the ML backend module 110 may generate ML data. The ML data may include information representative of the training, testing, or cross-validation process of the trained model 124 using the selected configuration settings and the train portion and/or the test portion. Additionally, the ML data may include data describing why particular graphs received a particular classification by the trained model 124.

The dataset analysis module 106 may receive the ML data from the ML backend module 110. In some embodiments, the dataset analysis module 106 may convert the ML data to ML results in a format that is human readable. As a non-limiting example, the dataset analysis module 106 may direct display of predicted labels of the ML data or a summary thereof (e.g., percent correct) via the GUI on the display screen 112. In some embodiments, the ML data may include numerical values representative of the graphs. In these and other embodiments, the dataset analysis module 106 may map the numerical values to alpha values (e.g., may de-map the numerical values to alpha values) that are compatible with the GUI.

For example, the dataset analysis module 106 may convert the ML data to the ML results in a format that is compatible with the GUI. As another example, the dataset analysis module 106 may convert the ML data to the ML results in the same tabular format as the datasets. Likewise, the dataset analysis module 106 may generate an explanation of the filtering and visualization included in the ML results. One or more examples of generating the explanation of the filtering and visualization included in the ML results are illustrated in Koji Maruhashi, Masaru Todoriki, Takuya Ohwa, Keisuke Goto, Yu Hasegawa, Hiroya Inakoshi, Hirokazu Anai, "Learning Multi-way Relations via Tensor Decomposition with Neural Networks," presented during the thirty second association for the advancement of artificial intelligence (AAAI) conference on artificial intelligence, February 2018, which is incorporated herein by reference in its entirety.

In some embodiments, the ML configuration and processing module 108 may generate the ML results to include at least one of a textual representation in a natural language, a tabular representation, and a graphical representation in the human readable format. In these and other embodiments, the ML configuration and processing module 108 may direct display of at least one of the textual representation in the natural language, the tabular representation, and the graphical representation in the human readable format via the GUI on the display screen 112. Likewise, the ML In some embodiments, the ML configuration and processing module 108 may generate a confusion matrix (e.g., an error matrix) indicating how many times the graphs in the test and/or train portions were correctly or incorrectly classified by the ML backend module 110. In these and other embodiments, the ML configuration and processing module 108 may direct display of the confusion matrix via the GUI on the display screen 112.

In some embodiments, the trained model 124 may be deployed as part of a production application 126. In these and other embodiments, the production application 126 may be used to perform classifications of graphs included in new datasets for a specific business application.

In some embodiments, the steps and processes performed by the dataset import and cleaning module 104, the dataset analysis module 106, and the ML configuration and processing module 108 may be performed independent of the specific ML algorithm being implemented by the ML backend module 110. In other embodiments, the steps and processes performed by the dataset import and cleaning module 104, the dataset analysis module 106, and the ML configuration and processing module 108 may be performed dependent of the specific ML algorithm being implemented by the ML backend module 110. For example, the specific ML algorithm being implemented may include the Deep-Tensor algorithm, which may be compatible with tensor matrices. The ML configuration and processing module 108 may provide the datasets as tensor matrices.

Figure 2:
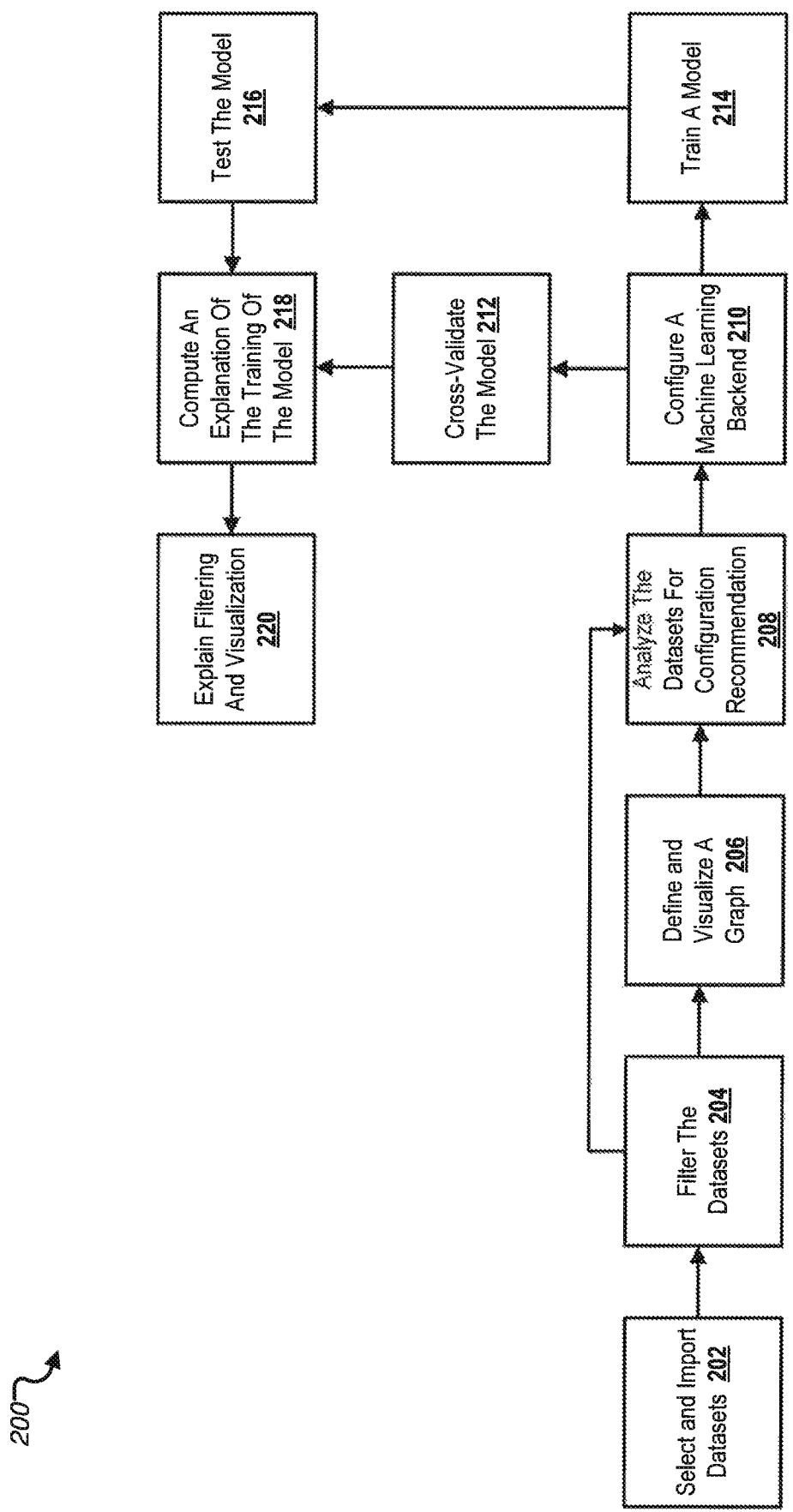
FIG. 2 illustrates a block diagram of an accessible ML process that may be implemented in the operating environment of FIG. 1.

FIG. 2 illustrates a block diagram of an accessible machine learning process 200 that may be implemented in the operating environment 100 of FIG. 1. The accessible machine learning process 200 may be implemented by the computing device, the dataset import and cleaning module 104, the dataset analysis module 106, the ML configuration and processing module 108, the ML backend module 110, and the display screen 112 of FIG. 1.

The dataset importing and cleaning module 104 may be configured to select and import datasets 202. In some embodiments, dataset importing and cleaning module 104 may be configured to direct display, on the display screen 112, of a dataset menu via the GUI. The dataset importing and cleaning module 104 may direct display of selectable elements via the GUI on the display screen 112 for the user to select datasets to import. The dataset importing and cleaning module 104 may import the selected datasets. For example, the dataset importing and cleaning module 104 may import the selected datasets from a dataset repository, such as the dataset repository 116 discussed above in relation to FIG. 1.

The dataset importing and cleaning module 104 may be configured to filter the datasets 204. In some embodiments, the dataset importing and cleaning module 104 may receive user input indicating features and or feature values in the datasets that may be filtered. In these and other embodiments, the dataset import and cleaning module 104 may filter the datasets as discussed above in relation to FIG. 1. Additionally, the dataset importing and cleaning module 104 may be configured to direct display of filter fields via the GUI on the display screen 112.

Figure 3A:
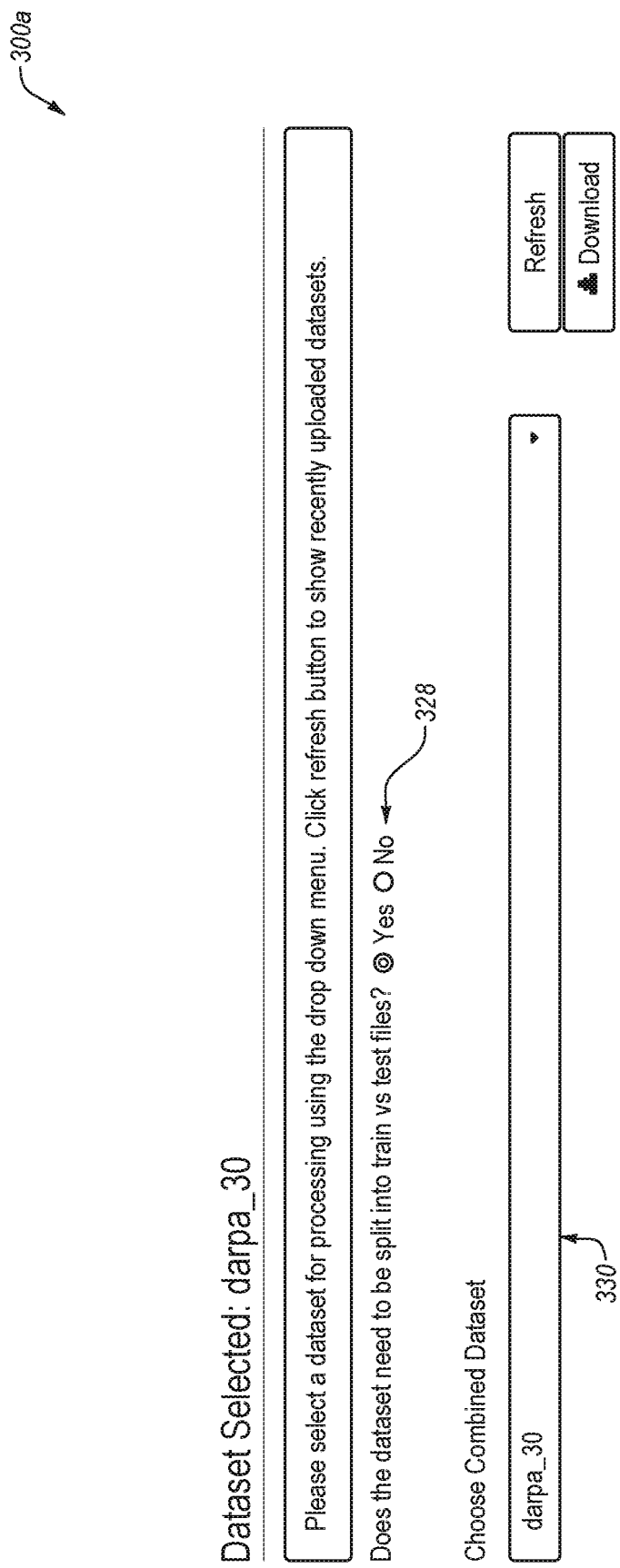

Referring to FIGS. 3A and 3B, the illustrated screen shots 300*a-c* illustrate a dataset menu 330, one or more feature filter fields 336, and one or more feature value filter fields 338. As illustrated in FIG. 3B, the user may select, via the GUI, to remove destination port data and comments data from the datasets. Additionally, as illustrated in FIG. 3B, the user may select, via the GUI, to include only feature values corresponding to activity that occurred after Jun. 15, 1998.

Referring back to FIG. 2, the dataset analysis module 106 may be configured to define and visualize a graph 206. In some embodiments, the dataset analysis module 106 may receive user input defining the graph. In these and other embodiments, the dataset analysis module 106 may define and visualize the graph as discussed above in relation to FIG. 1.

Figure 4:
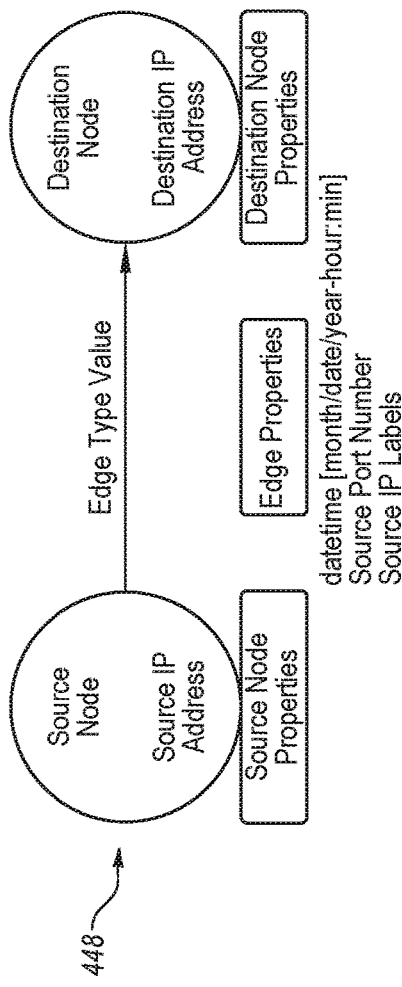
FIG. 4 illustrates a screen shot of the GUI displaying selection fields related to generating a graph representative of imported datasets that may be implemented in the computing device of FIG. 1.

Referring to FIG. 4, the illustrated screen shot 400 illustrates selection fields for defining nodes in the graph 444, selection fields for defining edges in the graph 446, and an illustrative example graph 448.

Referring back to FIG. 2, the dataset analysis module 106 may be configured to analyze the datasets for configuration recommendations 208. In some embodiments, the dataset analysis module 106 may select a mapping scheme, classify nodes and edges as sure dimensions, and label sure dimensions as discussed above in relation to FIG. 1. Additionally, the dataset analysis module 106 may be configured to direct display of the configuration settings selected by the dataset analysis module 106.

Referring to FIG. 5, the illustrated screen shot 500 illustrates a selection field to direct the dataset analysis module 106 to select the configuration settings 554 and an illustrative example of configuration settings 556 that may be selected by the dataset analysis module 106. Referring to FIG. 3A, the illustrated screen shot 300a illustrates a selection field 328 to direct the dataset analysis module 106 to separate the datasets into a train portion and a test portion.

Referring back to FIG. 2, the ML configuration and processing module 108 may be configured to configure a ML backend 210. In some embodiments, the ML configuration and processing module 108 may provide the datasets and a selected configuration settings to the ML backend. For example, the ML configuration and processing module 108 may provide the datasets and the selected configuration settings to the ML backend module 110 as discussed above in relation to FIG. 1.

The ML backend module 110 may be configured to train a model 214. In some embodiments, the ML backend module 110 may train the model (e.g., the trained model 124 of FIG. 1) using the train portion, the selected configuration settings, and a ML algorithm as discussed above in relation to FIG. 1. Additionally, the ML backend module 110 may be configured to test the model 216. In some embodiments, the ML backend module 110 may train the model using the test portion, the selected configuration settings, and the ML algorithm, as discussed above in relation to FIG. 1.

Additionally, the ML backend module 110 may be configured to cross-validate the model 212. In some embodiments, the ML backend module 110 may cross validate the model according to four fold division, five fold division, or any other appropriate method as discussed above in relation to FIG. 1. In these and other embodiments, the ML backend module 110 may be operated using both the train portion and the test portion for the cross validation of the model.

In some embodiments, the ML backend module 110 may generate ML data describing the training, the testing, and/or the cross-validation of the model. The ML data may be the same as or similar to the ML data described above in relation to FIG. 1. The ML backend module 110 may provide the ML data to the dataset analysis module 106. The dataset analysis module 106 may be configured to compute an explanation of the training of the model 218. In some embodiments, the dataset analysis module 106 may generate ML results (e.g., the explanation of the training of the model) based on the ML data. For example, the dataset analysis module 106 may convert the ML data from a numeric format to a format compatible with GUI. The ML results may include at least one of a textual representation in a natural language, a tabular representation in a human readable format, and a graphical representation in the human readable format as discussed above in relation to FIG. 1.

In some embodiments, the dataset analysis module 106 may be configured to explain filtering and visualization 220. The dataset analysis module 106 may generate the explanation of the filtering and visualization included in the ML results as discussed above in relation to FIG. 1. In some embodiments, the dataset analysis module 106 may filter the ML results or the graphical representation of the ML results based on user input. The explanation of the ML results may describe the training, testing, or cross-validation of the model in natural language that is readily understandable by the user.

Referring to FIG. 6, the illustrative screen shot 600 illustrates selection fields 664 including a train field, a test field, a cross-validate field, and fields for visualizing the ML results. Additionally, the illustrative screen shot 600 illustrates an example confusion matrix 670 that may be generated based on the training, testing, and/or cross-validation of the model.

Figure 7:
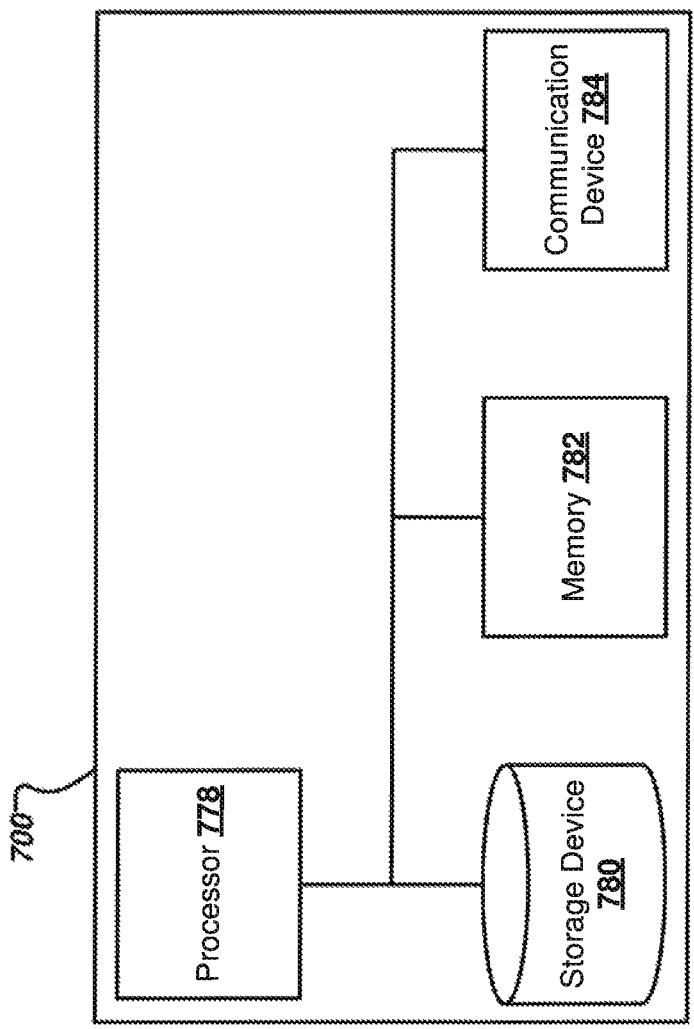
FIG. 7 is a block diagram of an example computing system.

FIG. 7 is a block diagram of the example computing system 700. The computing system 700 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

The computing system 700 may include a processor 778, a storage device 780, a memory 782, and a communication device 784. The processor 778, the storage device 780, the memory 782, and/or the communication device 784 may all be communicatively coupled such that each of the components may communicate with the other components. The computing system 700 may perform any of the operations described in the present disclosure.

In general, the processor 778 may include any suitable special-purpose or general-purpose computer, computing entity, or processing device including various computer hardware or software modules and may be configured to execute instructions stored on any applicable computer-readable storage media. For example, the processor 778 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 7, the processor 778 may include any number of processors configured to perform, individually or collectively, any number of operations described in the present disclosure.

In some embodiments, the processor 778 may interpret and/or execute program instructions and/or process data stored in the storage device 780, the memory 782, or the storage device 780 and the memory 782. In some embodiments, the processor 778 may fetch program instructions from the storage device 780 and load the program instructions in the memory 782. After the program instructions are loaded into the memory 782, the processor 778 may execute the program instructions.

For example, in some embodiments, one or more of the processing operations for the computing device 102 may be included in the storage device 780 as program instructions. The processor 778 may fetch the program instructions of one or more of the processing operations and may load the program instructions of the processing operations in the memory 782. After the program instructions of the processing operations are loaded into the memory 782, the processor 778 may execute the program instructions such that the computing system 700 may implement the operations associated with the processing operations as directed by the program instructions.

The storage device 780 and the memory 782 may include computer-readable storage media for carrying or having computer-executable instructions or data structures stored thereon. Such computer-readable storage media may include any available media that may be accessed by a general-purpose or special-purpose computer, such as processor 778. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 778 to perform a certain operation or group of operations.

In some embodiments, the storage device 780 and/or the memory 782 may store data associated with training and testing of models. For example, the storage device 780 and/or the memory 782 may store the datasets, the configuration setting, parameter settings, the graphical representation of the datasets, the graphical representation of the ML results, the ML data, or any other appropriate form of data discussed in the present disclosure.

The communication device 784 may include any device, system, component, or collection of components configured to allow or facilitate communication between the computing system 700 and another electronic device. For example, the communication device 784 may include, without limitation, a modem, a network card (wireless or wired), an infrared communication device, an optical communication device, a wireless communication device (such as an antenna), and/or chipset (such as a Bluetooth device, an 802.6 device (e.g., Metropolitan Area Network (MAN)), a Wi-Fi device, a WiMAX device, cellular communication facilities, etc.), and/or the like. Communication device 784 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 7 without departing from the scope of the present disclosure. For example, the computing system 700 may include more or fewer elements than those illustrated and described in the present disclosure. For example, the computing system 700 may include an integrated display device such as a screen of a tablet or mobile phone or may include an external monitor, a projector, a television, or other suitable display device that may be separate from and communicatively coupled to the computing system 700.

Figure 8:
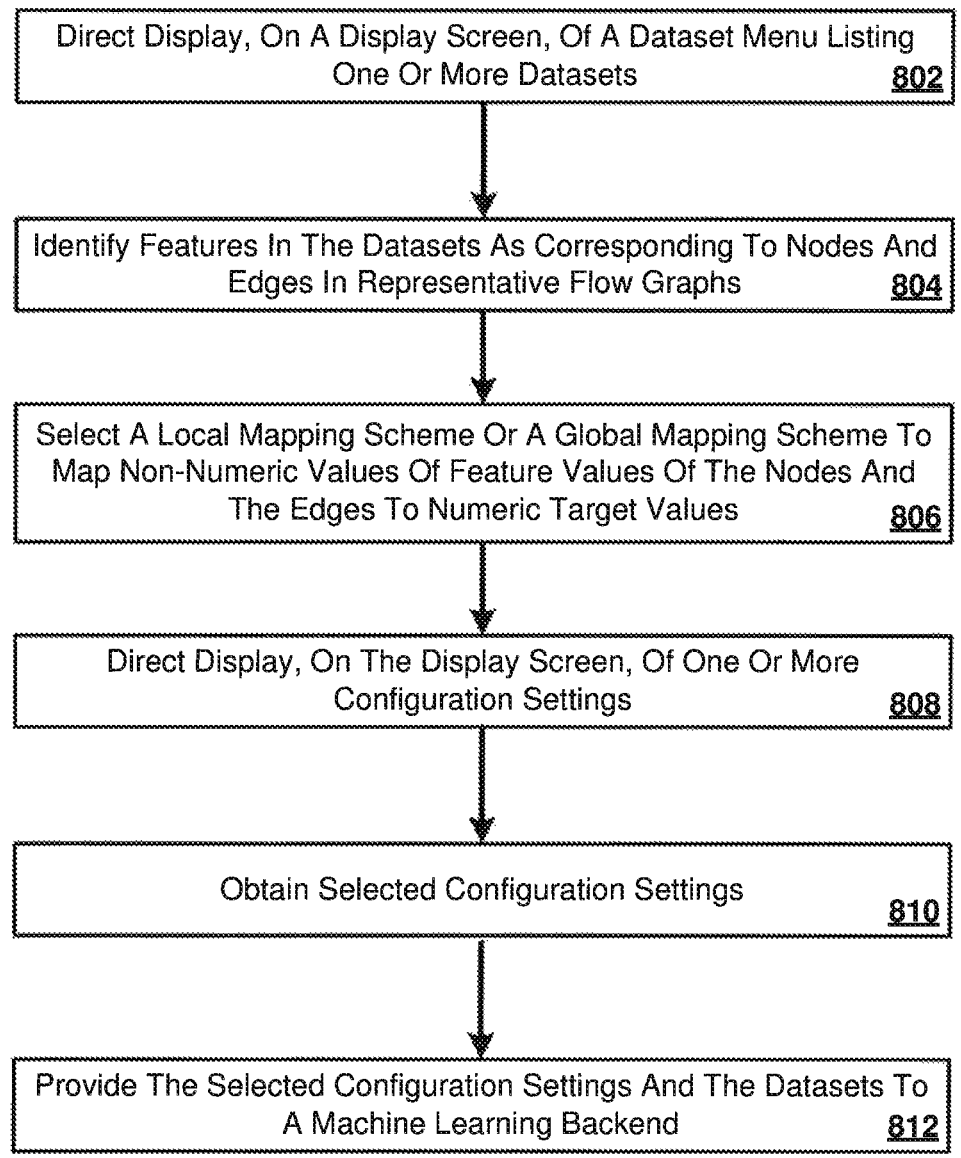
FIG. 8 illustrates a flowchart of an example method of generating the recommendation for configuration settings for ML, all according to at least one embodiment described in the present disclosure.

FIG. 8 illustrates a flowchart of an example method 800 of generating the recommendation for configuration settings for machine learning. The method 800 may be performed by any suitable system, apparatus, or device. For example, the computing device 102, the dataset import and cleaning module 104, the dataset analysis module 106, the ML configuration and processing module 108, the ML backend module 110, and the display screen 112 of FIG. 1 or one or more of the components of the computing system 700 of FIG. 7. In these and other embodiments, program instructions stored on a computer readable medium may be executed to perform one or more of the operations of the method 800. Further, each operation of the method 800 may be static or dynamic, and may be performed online (e.g., in real-time), or offline. Further, each operation of the method 800 may be performed incrementally or non-incrementally.

The method 800 may include a block 802, at which a dataset menu listing one or more datasets may be directed to be displayed on a display screen. In some embodiments, the datasets may be representative of one or more graphs. In these and other embodiments, the one or more datasets may include features and corresponding feature values. For example, the dataset import and cleaning module 104 may direct display of the dataset menu on the display screen 112 as discussed above in relation to FIG. 1. Block 802 may be followed by block 804.

At block 804, features in the datasets may be identified as corresponding to nodes and edges in representative graphs. In some embodiments, the features in the datasets may be identified as corresponding to nodes and edges responsive to a user selection of one or more datasets. In these and other embodiments, the one or more datasets may include features and corresponding feature values describing the nodes and the edges of the representative graphs. For example, the dataset import and cleaning module 104 may receive user input indicating one or more datasets to use for training a model. Block 804 may be followed by block 806.

At block 806, a local mapping scheme or a global mapping scheme to map non-numeric values of the feature values of the nodes and the edges to numeric target values may be selected. In some embodiments, the local mapping scheme may utilize unique values across different graphs. In these and other embodiments, local mapping may be selected for the nodes and the edges in response to a distribution of feature values of the nodes and edges not corresponding across different graphs. Additionally or alternatively, the global mapping scheme may utilize the same value across different graphs. Likewise, in some embodiments, the global mapping scheme may be selected for the nodes and the edges in response to a distribution of the feature values of the nodes and the edges corresponding across different graphs. For example, the dataset analysis module 106 may determine whether to perform local mapping or global mapping of the nodes and the edges in the datasets as discussed above in relation to FIG. 1. Block 806 may be followed by block 808.

At block 808, one or more configuration settings may be directed to be displayed on the display screen. In some embodiments, the configurations settings may be used for training a graph classification model to classify graphs based on the graphs represented by the datasets. In these and other embodiments, the configuration settings may indicate the selection between the local mapping scheme and the global mapping scheme for each of the non-numeric values of the feature values of the nodes and the edges. For example, the dataset analysis module 106 may direct display of the configuration settings selected by the dataset analysis module 106 on the display screen 112 as discussed above in relation to FIG. 1. Block 808 may be followed by block 810.

At block 810, selected configuration settings may be obtained. In some embodiments, the selected configuration settings may be obtained from the user responsive to directing display of the one or more configuration settings. For example, the ML configuration and processing module 108 may obtain the selected configuration settings as discussed above in relation to FIG. 1. Block 810 may be followed by block 812.

At block 812, the selected configuration settings and the datasets may be provided to a ML backend. In some embodiments, the ML backend may utilize a ML algorithm, the datasets, and the selected configuration settings to train the graph classification model. For example, the ML configuration and processing module 108 may provide the selected configuration settings and the datasets to the ML backend module 110 as discussed above in relation to FIG. 1. As another example, the ML backend module 110 may use the selected configuration settings, the datasets, and the ML algorithm to train the trained model 124 as discussed above in relation to FIG. 1.

Modifications, additions, or omissions may be made to the method 800 without departing from the scope of the present disclosure. For example, the operations of method 800 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Embodiments described in the present disclosure may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in the present disclosure, terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
    directing display, on a display screen, of a dataset menu listing one or more datasets, each dataset being representative of one or more graphs and including one or more features and each of the features including corresponding feature values;
    responsive to a user selection of one or more datasets, identifying features in the datasets as corresponding to nodes and edges in the representative graphs;
    selecting a local mapping scheme or a global mapping scheme to map categorical values of the feature values of the nodes and the edges to numeric target values for use by a machine learning algorithm, the local mapping scheme utilizing unique values across different graphs and being selected for nodes and edges in response to a distribution of feature values of the nodes and the edges not corresponding across different graphs and the global mapping scheme utilizing the same values across different graphs and being selected for nodes and edges in response to a distribution of the feature values of the nodes and the edges corresponding across different graphs such that the local mapping scheme is used for feature values that do not relate to feature values used in the global mapping scheme;
    directing display, on the display screen, of one or more configuration settings for training a graph classification model to classify graphs based on the graphs represented by the datasets, the configuration settings indicating the selection between the local mapping scheme and the global mapping scheme for each of the categorical values of the feature values of the nodes and the edges;
    responsive to directing display of one or more configuration settings, obtaining selected configuration settings from the user; and responsive to obtaining the selected configuration settings, providing the selected configuration settings and the datasets to a machine learning backend, the machine learning backend utilizing the machine learning algorithm, the datasets, and the selected configuration settings to train the graph classification model.

2. The method of claim 1, wherein selecting the local mapping scheme or the global mapping scheme comprises:
generating a histogram of the feature values for each graph;
determining, for each combination of the histograms, a distance between each feature value included in a set of combined histograms according to 1−cosine (distance corresponding to the feature occurrence in each graph); and
determining an average similarity value for each of the feature values across the histograms, wherein global mapping is selected for a corresponding node or edge if the average similarity value of the corresponding feature value is greater than a similarity threshold value and local mapping is selected for a corresponding node or edge if the corresponding average similarity value is equal to or less than the similarity threshold value.

3. The method of claim 2, wherein, responsive to global mapping being selected for one or more nodes or one or more edges, the method further comprises:
determining a number of unique feature values across the histograms; and
selecting a data reduction scheme or a non-data reduction scheme for each node and edge for which global mapping is being utilized based on whether the number of unique feature values across the histograms exceeds a unique value threshold value, the data reduction scheme reducing a number of feature values corresponding to each node and edge for which global mapping is being utilized and being selected in response to the number of unique feature values across the histograms exceeding the unique value threshold value and the non-data reduction scheme not reducing the number of feature values corresponding to each node and edge for which global mapping is being utilized and being selected in response to the number of unique feature values across the histograms not exceeding the unique value threshold value.

4. The method of claim 2, wherein selecting the local mapping scheme or the global mapping scheme further comprises:
classifying each feature in the datasets as either a sure dimension or a possible dimension;
determining a correlation value for each combination of possible dimensions and sure dimensions; and
comparing each correlation value to a statistical significance threshold value, wherein one or more possible dimensions are classified as labels of the sure dimension if the corresponding correlation value is greater than or equal to the statistical significance threshold value and one or more possible dimensions are re-classified as the sure dimension if the corresponding correlation value is less than the statistical significance threshold value.

5. The method of claim 4, wherein selecting the local mapping scheme or the global mapping scheme is performed using the feature values corresponding to features classified as sure dimensions and the feature values corresponding to possible dimensions re-classified as sure dimensions.

6. The method of claim 1, wherein the selected configuration settings include configuration settings that are different than the configuration settings directed to be displayed and the configuration settings are manually configurable through selectable elements associated with the configuration settings.

7. The method of claim 1, further comprising:
directing display, on the display screen, of one or more train and test fields and elements being selectable to indicate percentages of the datasets to separate as a train portion and a test portion; and
separating, responsive to the user selecting one or more elements, the datasets into the train portion and the test portion based on the elements that were selected.

8. The method of claim 7, further comprising directing display, on the display screen, of a confusion matrix indicating a number of times graphs represented by the train portion were correctly identified during the training of the graph classification model.

9. The method of claim 1, further comprising:
receiving machine learning data from the machine learning backend, the machine learning data being indicative of performance of the training of the graph classification model using the datasets and the selected configuration settings; and
directing display, on the display screen, of machine learning results explaining classification of graphs represented in the datasets during the training of the graph classification model, the machine learning results being representative of the machine learning data in a human readable format.

10. The method of claim 9, wherein the machine learning results include at least one of: a textual representation in a natural language, a tabular representation, and a graphical representation in the human readable format and the method further comprising directing display, on the display screen, of at least one of the textual representation in the natural language, the tabular representation, and the graphical representation in the human readable format.

11. A system comprising:
one or more computer-readable storage media configured to store instructions; and
one or more processors communicatively coupled to the one or more computer-readable storage media and configured to, in response to execution of the instructions, cause the system to perform operations of generating recommendation for one or more configuration settings, the operations comprising:
directing display, on a display screen, of a dataset menu listing one or more datasets, each dataset being representative of one or more graphs and including one or more features and each of the features including corresponding feature values;
responsive to a user selection of one or more datasets, identifying features in the datasets as corresponding to nodes and edges in the representative graphs;
selecting a local mapping scheme or a global mapping scheme to map categorical values of the feature values of the nodes and the edges to numeric target values for use by a machine learning algorithm, the local mapping scheme utilizing unique values across different graphs and being selected for nodes and edges in response to a distribution of feature values of the nodes and the edges not corresponding across different graphs and the global mapping scheme utilizing the same values across different graphs and being selected for nodes and edges in response to a distribution of the feature values of the nodes and the edges corresponding across different graphs such that the local mapping scheme is used for feature values that do not relate to feature values used in the global mapping scheme;

directing display, on the display screen, of one or more configuration settings for training a graph classification model to classify graphs based on the graphs represented by the datasets, the configuration settings indicating the selection between the local mapping scheme and the global mapping scheme for each of the categorical values of the feature values of the nodes and the edges;

responsive to directing display of the one or more configuration settings, obtaining selected configuration settings from the user; and responsive to obtaining the selected configuration settings, providing the selected configuration settings and the datasets to a machine learning backend, the machine learning backend utilizing the machine learning algorithm, the datasets, and the selected configuration settings to train the graph classification model.

12. The system of claim 11, wherein the operation of selecting the local mapping scheme or the global mapping scheme comprises:

generating a histogram of the feature values for each graph;

determining, for each combination of the histograms, a distance between each feature value included in a set of combined histograms according to 1−cosine (distance corresponding to the feature occurrence in each graph); and determining an average similarity value for each of the feature values across the histograms, wherein global mapping is selected for a corresponding node or edge if the average similarity value of the corresponding feature value is greater than a similarity threshold value and local mapping is selected for a corresponding node or edge if the corresponding average similarity value is equal to or less than the similarity threshold value.

13. The system of claim 12, wherein, responsive to global mapping being selected for one or more nodes or one or more edges, the operations further comprise:

determining a number of unique feature values across the histograms; and selecting a data reduction scheme or a non-data reduction scheme for each node and edge for which global mapping is being utilized based on whether the number of unique feature values across the histograms exceeds a unique value threshold value, the data reduction scheme reducing a number of feature values corresponding to each node and edge for which global mapping is being utilized and being selected in response to the number of unique feature values across the histograms exceeding the unique value threshold value and the non-data reduction scheme not reducing the number of feature values corresponding to each node and edge for which global mapping is being utilized and being selected in response to the number of unique feature values across the histograms not exceeding the unique value threshold value.

14. The system of claim 12, wherein the operation of selecting the local mapping scheme or the global mapping scheme further comprises:

classifying each feature in the datasets as either a sure dimension or a possible dimension;

determining a correlation value for each combination of possible dimensions and sure dimensions; and comparing each correlation value to a statistical significance threshold value, wherein one or more possible dimensions are classified as labels of the sure dimension if the corresponding correlation value is greater than or equal to the statistical significance threshold value and one or more possible dimensions are re-classified as the sure dimension if the corresponding correlation value is less than the statistical significance threshold value.

15. The system of claim 14, wherein the operation of selecting the local mapping scheme or the global mapping scheme is performed using the feature values corresponding to features classified as sure dimensions and the feature values corresponding to possible dimensions re-classified as sure dimensions.

16. The system of claim 11, wherein the selected configuration settings include configuration settings that are different than the configuration settings directed to be displayed and the configuration settings are manually configurable through selectable elements associated with the configuration settings.

17. The system of claim 11, the operations further comprising:

directing display, on the display screen, of one or more train and test fields and elements being selectable to indicate percentages of the datasets to separate as a train portion and a test portion; and separating, responsive to the user selecting one or more elements, the datasets into the train portion and the test portion based on the elements that were selected.

18. The system of claim 17, the operations further comprising directing display, on the display screen, of a confusion matrix indicating a number of times graphs represented by the train portion were correctly identified during the training of the graph classification model.

19. The system of claim 11, the operations further comprising:

receiving machine learning data from the machine learning backend, the machine learning data being indicative of performance of the training of the graph classification model using the datasets and the selected configuration settings; and directing display, on the display screen, of machine learning results explaining classification of graphs represented in the datasets during the training of the graph classification model, the machine learning results being representative of the machine learning data in a human readable format.

20. The system of claim 19, wherein the machine learning results include at least one of: a textual representation in a natural language, a tabular representation, and a graphical representation in the human readable format and the operations further comprising directing display, on the display screen, of at least one of the textual representation in the natural language, the tabular representation, and the graphical representation in the human readable format.

* * * * *